Dec. 14, 1948.     L. T. KNUTSON     2,456,003
UNIVERSAL INDICATOR SUPPORT

Filed May 30, 1945     2 Sheets-Sheet 1

INVENTOR.
Lester T. Knutson
BY
Attorney

Dec. 14, 1948.  L. T. KNUTSON  2,456,003
UNIVERSAL INDICATOR SUPPORT
Filed May 30, 1945  2 Sheets-Sheet 2
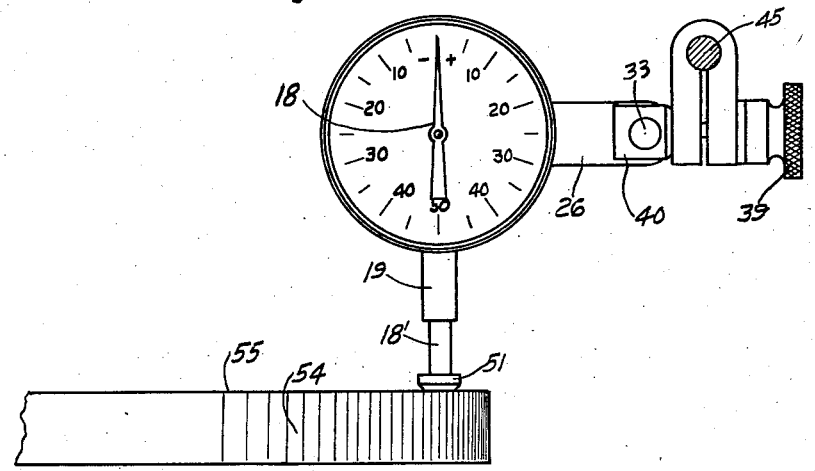
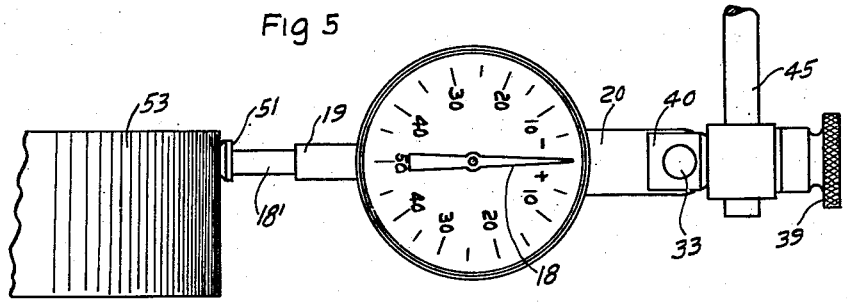
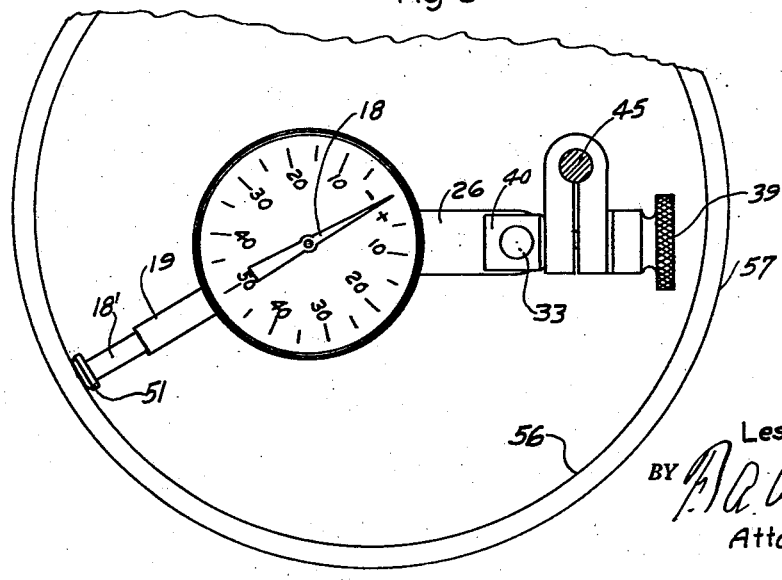
INVENTOR.
Lester T. Knutson
Attorney Patented Dec. 14, 1948

2,456,003

UNITED STATES PATENT OFFICE 2,456,003

UNIVERSAL INDICATOR SUPPORT

Lester T. Knutson, Minneapolis, Minn.

Application May 30, 1945, Serial No. 596,769

4 Claims. (Cl. 248—124)

My invention relates to a universal indicator for lathes and similar machine tools, and has for its object to provide an indicator for use, particularly in connection with turret lathes, but also adaptable for use with other machine tools, which shall be adaptable for use in many different positions and be quickly applicable to all types of work upon which lathe operations have been performed.

Lathe indicators have long been employed and consist in general of a plunger device having a head adapted to engage the surface of work, and having gearing operated by movements of the plunger device which has connection with a form of arrow indicator over a scale. As the work revolves the head engages a circular surface thereof and the movements of the needle, with its head in rotative engagement with the surface, will indicate to the operator the degree and place on the surface where it does not approximate a true circle or cylinder. As such indicators have been furnished and used prior to my invention, a great deal of difficulty is encountered in positioning the contacting head effectively for different kinds of work and much time is consumed in building up means for holding the indicator on a very large number of different types of work.

I have discovered a way to mount the indicator and its plunger and head thereon so that they form a substantially universal point of support from a fixed part on the machine. Substantially universal movements of the plunger and its head may be made to bring the plunger into contact with work in substantially every conceivable position.

It is a principal object of my invention, therefore, to so mount the indicator and particularly the plunger and head thereon that it may be swung in circles in three planes at right angles to each other, whereby the plunger head may contact work to right or left throughout the arc of a circle. Up or down through the arc of a circle, or in any vertical plane throughout the arc of a circle, these combinations being such as to make possible the application of the plunger head to a rotating cylinder held in any position, a rotating plate on either surface held in substantially any position and the inside of a rotating cylinder held in substantially any position.

The full objects and advantages of my invention will appear in connection with the detailed description thereof which will now be given in the appended specifications, and the novel features of my invention by which the aforesaid advantageous results are obtained will be particularly pointed out in the claims.

In the drawings illustrating an application of my invention in one of its forms:

Fig. 4 illustrates the position of the indicator relative to a plane face of a piece of work and which position may be shifted throughout the arc of a circle according to the operative position of the piece of work.

Fig. 5 illustrates the position of the indicator and its head in engagement with the cylindrical outer surface of a piece of work which is held in a position at right angles to the position of the work in Fig. 3.

Fig. 6 illustrates a position of the indicator where the plunger head engages an inside cylindrical surface.

Figure 1:
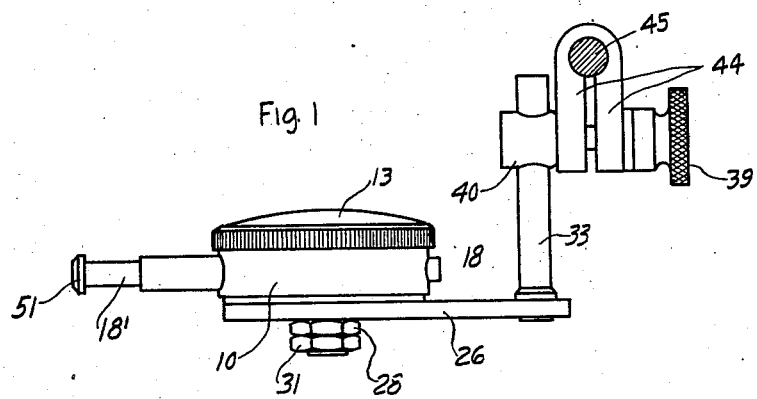
Fig. 1 is a side elevation view of the complete invention.

The indicator itself is in most particulars of standard construction comprising the casing 10 circular and cylindrical in outer outline, having a horizontal top partition 11, a scale guard 12 and a transparent cover 13. Within a chamber 14 in the casing is mounted gearing 15, 16 which rotates a shaft 17 having thereon a pointer or needle 18.

The gearing 16 is driven by a rack 17 on a plunger member 18' which is mounted for exact right line movement in a pair of spaced tubes 19 and 20 supported in the cylindrical side walls of the casing 10.

The plunger is normally pushed outward by a spring 21 to bring the top of set screw 22 into engagement with the inner end 23 of the tube 19. Longitudinal movement of the plunger by contact with the surface being tested due to non-uniformity of that surface, either as a cylinder or as a plane face, will be transmitted much magnified to the needle 18, which will indicate to the operator how much the surface is out of true and what he must do or continue to do to rectify it.

As stated, the above described features of the indicator instrument are of standard construction. However, the bottom wall of the old construction is very different from the bottom wall of my construction. In the old construction the bottom is formed as a clamp to seize and hold some member secured to a fixed part of the machine.

In my invention I form the bottom 24 with a central outwardly extending stud 25 which is adapted to extend through a plate arm 26 through an opening 27 therein. The bottom 24 has an annular cut-out portion 28 surrounding the stud leaving an annular surface 29 on bottom wall 24.

The stud 25 is threaded and has thereon a nut 30 and a lock nut 31 which hold the plate arm 26 in engagement with the annular surface 29 with sufficient force so that it is held rigid but yet so that the plate 26 may be turned upon the spindle 25. A round opening 32 is formed on the end of plate 26 and receives the end of a pin or shaft 33. This end is swaged at 34 to rigidly attach the shaft 33 to the plate 26.

Figure 2:
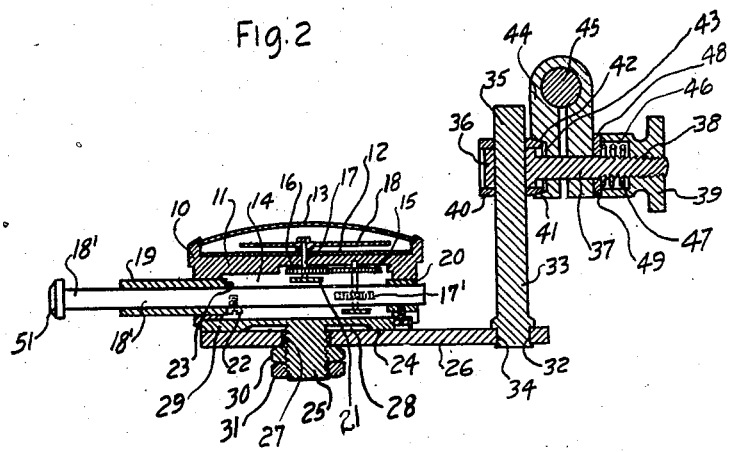
Fig. 2 is a sectional elevation view of the invention taken through a vertical plane of what is shown in Fig. 1.

The upper end 35 of shaft 33 extends through an opening in a head 36 formed on the end of a bolt extension 37 which is threaded at 38 and receives on its threaded end a hand nut 39. A clip member 40, Fig. 2, surrounds the upper part 35 of shaft 33 and has holes on opposite sides to permit the part 35 of shaft 33 to pass through. This clip member has beveled feet 41 and 42 which engage in a correspondingly beveled recess 43 in a clamp 44. This clamp 44 is adapted to be slipped over a supporting rod 45, formed in conjunction with or rigidly attached to a part of the turret lathe or other machine.

The hand nut 39 is formed with a recess 46 in which is mounted a compression spring 47 and a washer 48 which is positioned within the annular inner edge 49 of the clip member 44. Hence when the hand nut 39 is turned down it may compress the spring and at the same time lock the clamp on the rod 45 and tighten the clip member 40 upon the upper end 35 of the shaft 33. This will hold the shaft 33 firmly in position.

Yet ordinarily it will not be held so tight but that the plate 26 and parts carried thereby can be rotated in the bearing of the shaft in the clip 40. Or if the pressure is too great so the parts are held rigidly together and shaft 33 cannot be rotated easily, a short turn of hand nut 39 will release it sufficiently for rotation to any degree desired. Also a loosening of the nut 39 will sufficiently release the clamp 44 to permit rotation thereof on the rod 45.

This arrangement is such that the indicator casing itself may be rotated upon stud 25. The plate 26 and shaft 33 extending at right angles thereto may be rotated within the head 36 and clip 40. The shaft 33 mounted in the head 36 and pin 37 may be rotated about an axis running through said pin, and the entire assemblage may be rotated in a plane at right angles to the last-named rotation about the fixed rod 45.

Combinations of these movements make possible the presentation of the contacting head 51 to the surface of work, either an outer cylindrical surface, an inner cylindrical surface, a top or bottom face surface, or an upper, lower or outer edge surface where the work is held in any position in the machine. Some of the very large number of possible positions of the head relative to different types and positions of work are shown in Figs. 3, 4, 5, and 6.

Figure 3:
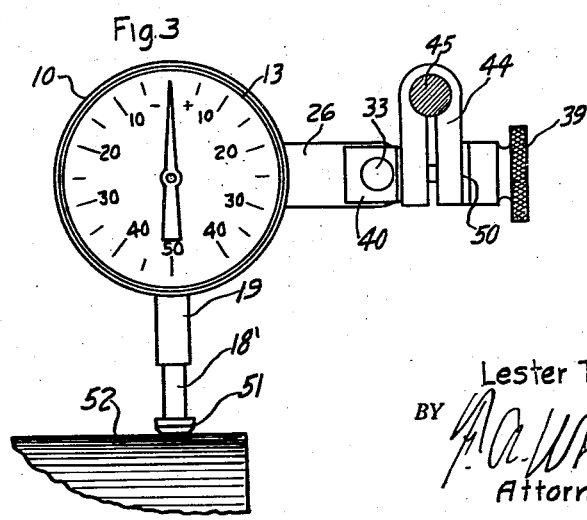
Fig. 3 illustrates the position of the indicator when the head is engaging in a substantially horizontal plane upon work cylindrical in outline.

In Fig. 3 a cylindrical member 52 such as a shaft or similar device is the work shown. The contact of head 51 is made directly upon the outer surface of the work piece 52. In the form shown in Fig. 3, 52 is rotating around a longitudinal axis and the head 51 and the axis of the plunger member 18' are normal to the surface of the work 52, that is the axis of the plunger member 18' will extend at substantially right angles to the elements of the cylindrical surface of the work cylinder 52, as is necessary.

In this form of work and its position, the surface engaged by the plunger head 51 is shown as substantially parallel to the edges of plate 26. Hence, the axis of the plunger 18' will be held at substantially a right angle to the central line of plate 26.

However, the work 52 may be held at any angle relative to the plate 26, and the head 51 can be easily adjusted to contact the surface of work 52 with the axis of the plunger 18' at right angles thereto, as for example in Fig. 5, where the work 53 rotates about a vertical axis and the plunger 18' carrying the head 51 is in extended alignment with the plate 26.

Furthermore, to get this position, from the position of Fig. 3, the plate arm and shaft 33 were first rotated through 90° upon the spindle 25 to bring the plunger 18' into alignment with the plate arm 26. Then the assembly will be rotated in clamp 44 to bring the plane of the plate 26 at right angles to the axis of fixed rod 45, as viewed in full plan in Fig. 5.

To get the position of Fig. 4 work 54 has its flat rotating surface 55 contacted by the head 51 of plunger 18'. As shown, the plunger's axis extends at right angles to the plate arm 26 but it is obvious that in adjusting the instrument the plunger can be turned to any angle to the plate bar as for example, as it is shown in Fig. 6, to adjust the plunger head 51 to the surface to be engaged; for all that is necessary is to have the axis of the plunger 18' extend at right angles to the surface of the work.

The fixed member 45 may be, as shown, a round rod or it may be any other form of fixed member to which the clamp 44 may be attached. On machine tools as customarily manufactured there are places for securing such a fixed member to the tool head and this member 45 is adapted to be used in connection with any such securing means.

The precise method of swiveling the several parts together so as to get at the same time universal movement and sufficient holding rigidity is not necessarily limited to the means shown, the essential feature being that the various parts, while capable of four or more swiveling movements, are so held together, with a requisite degree of essential rigidity to produce accurate indications effected by the back and forth movement of the plunger 18' by reason of contact of its head 51 with a surface of work being operated upon. A high degree of rigidity in holding the plunger is in fact essential to get accurate indications.

The advantages of my invention, will, it is believed, be clear from the description of the parts, their relations and their operation given in the foregoing specification. The primary and significant advantage resides in the fact that when the entire apparatus is suspended or held upon a fixed supporting member, the relative movements of the parts will be such as to enable the plunger head 51 to be presented at right angles to any surface being operated upon.

A further and highly important advantage closely connected with that above described is to hold these parts together, notwithstanding the universal movements for presenting the plunger head, in such a way as to make the whole assemblage, when set in operative position, substantially rigid.

Other advantages arise from the low cost of manufacture, the ease with which the device may be assembled and set up, and the consequent large saving of time over other methods employed.

I claim:

1. In combination with an indicator having a casing and a plunger with a head thereon adapted to contact a rotating surface whereby the indicator will reveal irregularities of said surface, a plate member, means rigidly connected with the plate member for supporting both said plate member and the indicator, and means for rotatably mounting the indicator on a lateral surface of said plate member.

2. In combination with a machine and an indicator supporting means for rotatably mounting said indicator on said machine, which comprises a universal clamp adapted to be mounted on a machine, an arm member rotatably carried by said clamp, a first plate member having a plane surface, said first plate member being rigidly connected with said arm member at right angles thereto, and means including a back plate to the indicator casing formed with a central outwardly extending stud which extends through an aperture in said first plate member for rotatably mounting the indicator on a plane surface of the first plate member.

3. In combination with a machine and an indicator, supporting means for rotatably mounting said indicator on said machine which comprises a first plate member, supporting means for mounting said member on said machine, a cup-shaped plate member having a narrow edge in contact with said first plate member which is adapted to rotatably support an indicator on said first plate member, and securing means for clamping said cup-shaped member in any one of a plurality of positions with relation to said first plate member.

4. In combination with a machine and an indicator, means for rotatably mounting said indicator with respect to a work surface, which comprises an arm structure carried by said machine, a first plate member rigidly connected to said arm structure, a cup-shaped member which is adapted to support an indicator on said first plate member, means for rotating said cup-shaped member in relation to said first plate member, and means for securing said first-named means in any one of a plurality of positions in relation to said first plate member.

LESTER T. KNUTSON.

REFERENCES CITED

The following references are of record in the file of this patent:

UNITED STATES PATENTS

| Number | Name | Date |
|---|---|---|
| 1,279,703 | James | Sept. 24, 1918 |
| 1,403,795 | Lippert | Jan. 17, 1922 |
| 2,073,089 | Autenrieth | Mar. 9, 1937 |
| 2,124,006 | Parker | July 19, 1938 |
| 2,304,460 | Kelleher | Dec. 8, 1942 |

FOREIGN PATENTS

| Number | Country | Date |
|---|---|---|
| 82,269 | Switzerland | Dec. 7, 1918 |
| 132,968 | Great Britain | Oct. 2, 1919 |